US008095442B2

(12) United States Patent
Baumann et al.

(10) Patent No.: US 8,095,442 B2
(45) Date of Patent: Jan. 10, 2012

(54) SYSTEMS AND METHODS FOR CALCULATING SPECIFIED MATRICES

(75) Inventors: Marcus Baumann, Sandhausen (DE); Markus Kahn, Walldorf (DE)

(73) Assignee: SAP AG, Walldorf (DE)

( * ) Notice: Subject to any disclaimer, the term of this patent is extended or adjusted under 35 U.S.C. 154(b) by 1550 days.

(21) Appl. No.: 11/443,096

(22) Filed: May 31, 2006

(65) Prior Publication Data

US 2006/0280302 A1 Dec. 14, 2006

(30) Foreign Application Priority Data

Jun. 8, 2005 (EP) .................................... 05012313

(51) Int. Cl.
*G06Q 40/00* (2006.01)
(52) U.S. Cl. ........................................ 705/35; 705/7.11
(58) Field of Classification Search ................. 705/7.11, 705/35
See application file for complete search history.

(56) References Cited

U.S. PATENT DOCUMENTS

| | | | |
|---|---|---|---|
| 7,383,219 B1 | 6/2008 | Jennings et al. | |
| 7,469,227 B2 | 12/2008 | Breeden et al. | |
| 7,530,490 B1 | 5/2009 | Finkemeier et al. | |
| 7,720,729 B2 * | 5/2010 | Wilce et al. ............ | 705/35 |
| 2003/0088492 A1 | 5/2003 | Damschroder | |
| 2003/0144945 A1 | 7/2003 | Opsahl-Ong et al. | |
| 2005/0071266 A1 * | 3/2005 | Eder ..................... | 705/38 |
| 2006/0015425 A1 | 1/2006 | Brooks | |
| 2006/0069635 A1 | 3/2006 | Ram et al. | |
| 2006/0229963 A1 | 10/2006 | Creager et al. | |
| 2006/0280302 A1 | 12/2006 | Baumann et al. | |
| 2009/0018891 A1 * | 1/2009 | Eder ..................... | 705/10 |

OTHER PUBLICATIONS

U.S. Appl. No. 11/191,985, filed Jul. 29, 2005, entitled "System and methods for business partner ranking in banks".
Michel Araten, Michael Jacobs Jr., Peeyush Varshney, and Claude R. Pellegrino, "An Internal Ratings Migration Study," The RMA Journal, Apr. 2005, pp. 92-97.
Yusuf Jafry and Til Schuermann, "Measurement, Estimation and Comparison of Credit Migration Matrices," printed Mar. 2004, pp. 1-52.
Anil Bangia, Francis X. Diebold, and Til Schuermann, "Ratings Migration and the Business Cycle, With Applications to Credit Portfolio Stress Testing," The Wharton School, University of Pennsylvania, Sep. 28, 2000, pp. 1-44.
Notice of Appeal filed in the European Patent Office on Apr. 9, 2010 in corresponding European Patent Application No. 05 012 313.2-1527 (16 pages).
Response to Notice of Appeal filed in the European Patent Office on Apr. 12, 2010 in corresponding European Patent Application No. 05 012 313.2-1527 (16 pages).
Amended Claims from Auxiliary Request No. 3 filed in the European Patent Office on Jun. 8, 2005, in corresponding European Patent Application No. 05 012 313.Feb. 1527 (5 pages).
Amended Claims from Auxiliary Request No. 4 filed in the European Patent Office on Oct. 8, 2009, in corresponding European Patent Application No. 05 012 313.2-1527 (4 pages).

(Continued)

*Primary Examiner* — Jagdish Patel
*Assistant Examiner* — Sara Chandler
(74) *Attorney, Agent, or Firm* — Finnegan, Henderson, Farabow, Garrett & Dunner, LLP (57) ABSTRACT

Computer-implemented methods, computer systems, and computer program products are provided for determining specified matrices. The matrices may be associated with financial institutions and the financial affairs in a banking practice. In one implementation, a base matrix is formed which may be used to create the specified matrices when processing mass data.

17 Claims, 2 Drawing Sheets

OTHER PUBLICATIONS

Amended Claims from Auxiliary Request No. 5 filed in the European Patent Office on Nov. 11, 2009, in corresponding European Patent Application No. 05 012 313.2-1527 (4 pages).
Basel II, located at http://de.wikipedia.org/wiki/Basel_II last edited Oct. 2009 (6 pages), including certified English translation (17 pages).
Mindesteigenkapitalanforderunger für Kreditrisiken, located at http://de.wikipedia.org/wiki/Mindesteigenkapitalanforderungen_ f%C3%BCr_Kreditrisiken, last edited Oct. 2009 (5 pages), including certified English translation (8 pages).
Han, J. et al., "Data Mining: Concepts and Techniques," Academic Press, Sep. 2000; pp. 1-104.
Ponniah, P., "Data Warehousing Fundamentals: A Comprehensive Guide for IT Professionals," John Wiley & Sons, Inc., Aug. 2001; pp. 1-62.
Richtlinie; 2006/48/EG; Des Europaischen Parlaments Und Des Rates; vol. 14; Jun. 2006; pp. 1-200.
Richtlinie; 2006/49/EG; Des Europaischen Parlaments Und Des Rates; vol. 14; Jun. 2006; pp. 201-255.

* cited by examiner

SYSTEMS AND METHODS FOR CALCULATING SPECIFIED MATRICES

TECHNICAL FIELD

The present invention generally relates to electronic data processing. More particularly, the invention relates to computer-implemented methods, computer systems, and computer program products for determining specified matrices. The specified matrices may be associated with financial institutions and with financial affairs in banking practice, for example.

BACKGROUND INFORMATION

As international financial markets expand, global concerns over the soundness of banking practices are driving stringent new requirements for bank-level management, regulatory control, and market disclosure. Data processing systems may use software tools, such as SAP proprietary software tools, to meet these banking requirements. One example of such a SAP software tool is Basel Capital Accord (Basel II) (commercially available from SAP AG, Waldorf, Germany), which enhances the capabilities of the SAP banking solution portfolio.

The SAP solution for the Basel II represents a risk-sensitive framework that provides capabilities for calculating risk exposure, calculating capital, managing market risk, managing interest risk, managing liquidity risk, calculating and managing all areas of credit risk, and facilitating the handling of mass data. Basel II may serve the economic interests associated with financial institutions and associated with financial affairs in banking practice.

In view of prior software tool solutions for banking systems, there still remains the need to improve the software performance (e.g., runtime performance). According to the Basel II capital record rating, data must be analyzed regularly in the form of portfolio and migration matrices. One problem is calculating the rating portfolio and migration matrices efficiently. Usually, the underlying mass data may not allow computer-based main memory processing since the large amount of data may exceed the memory limits of the computer.

Therefore, there exists a need to provide methods and systems for reducing the processing time needed to calculate data necessary to assess the risks according to Basel II, as mentioned above. There also exists a need to provide methods and systems for guarantying the data and process integrity.

SUMMARY OF THE INVENTION

Consistent with embodiments of the invention, methods and systems are provided to determine specified matrices, such as matrices associated with financial institutions and with financial affairs and banking practice. Embodiments of the invention can be easily integrated into existing credit risk platforms as, for example, the above-mentioned SAP solution Basel II.

In accordance with embodiments of the invention, computer systems and computer program products may be provided for determining specified matrices. Further, a computer readable medium may be provided for storing a plurality of instructions implemented by a computer program to execute a computer-implemented method. The computer-implemented method may optionally perform an automated generic aggregation of data in either a linear or a parallel processing mode, thereby improving the computer power of software, particularly when using mass data.

Consistent with an embodiment of the invention, a computer-implemented method is provided for determining specified matrices, such as matrices associated with financial institutions and financial affairs in banking practice. The method may include receiving mass data from one or more databases of one or more different data sources associated with banking practice, the mass data including sets of rows and sets of columns, each row corresponding to a record, and the columns including fields of predetermined granularity characteristics and fields of predetermined key figures. The method may also include selecting predetermined granularity characteristics and predetermined key figures, selecting predetermined aggregation operations to be performed, and reading input data packages from the one or more databases. The method may also include processing the data packages by identifying the customized granularity characteristics, identifying the predetermined key figures, and aggregating the records in each data package for key figures by using aggregation operations. In addition, the method may include forming at least one base matrix comprising the aggregated records of the customized granularity characteristics and key figures by saving the results of processing each data package and using the base matrix to calculate the specified matrices.

In accordance with an embodiment of the invention, the aggregation may be computed on at least one of predetermined key figures using predetermined aggregation operations selected from a function pool and customer-defined aggregation operations to be defined with input using the predetermined aggregation operations.

In another embodiment of the invention, the aggregation may be computed on customer-defined key figures to be defined with input using the predetermined aggregation operations selected from a function pool and using at least one of the predetermined aggregation operations and the customer-defined aggregation operations.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate embodiments of the invention and together with the description, serve to explain the principles of the invention. In the drawings.

DETAILED DESCRIPTION

Reference will now be made in detail to the present invention, examples of which are illustrated in the accompanying drawings in which like reference numbers refer to corresponding elements.

Consistent with an aspect of the invention, computer-implemented methods may be provided for determining specified matrices, such as matrices associated with financial institutions and with financial affairs and banking practice. In addition, data processing systems, computer program products that can be stored on a computer-readable medium, and a computer-readable medium may be provided.

Data processing systems (computer systems) consistent with the invention may include a single data processor or a plurality of data processors via inter-computer network, each data processor including processing means (processor), storage means (memory), bus means (bus), network means (network), interface means, input means, and output means (input and output devices). The computer system may comprise a server. The data processor may be, for example, a conventional desktop computer, a multiprocessor computer, or the like. The processor may be, for example, a Central Processing Unit (CPU), a Micro Controller Unit (MCU), Digital Signal Processor (DSP), or the like.

Storage means may store the specified mass data. Storage means may be memory for temporarily or permanently storing data and instructions. Although memory is conveniently illustrated as part of computer, memory may also be implemented in network, in computers and in a processor itself, such as in a cache or a register. Memory can be, for example, Read Only Memory (ROM), Random Access Memory (RAM), or memory with other access options. Memory may be implemented by computer-readable media, for example: (a) magnetic media, such as hard disk, floppy disk or other magnetic disk, tape or cassette tape; (b) optical media, such as optical disk (CD-ROM, DVD); and/or (c) semiconductor media, like DRAM, SRAM, EPROM, EEPROM, or the like. Memory may also store support modules, such as a Basic Input Output System (BIOS), an Operating system (OS), a program library, a compiler or interpreter, and a text processing tool.

Input means may be any device for providing data and instructions for processing by computer, such as a keyboard or pointing device such as a mouse, trackball, or cursor direction key. Output means may be any device for presenting results of aggregated data packages, such as a printer, monitor, or a display (e.g., a Cathode Ray Tube (CRT), Flat Panel Display, Liquid Crystal Display (LCD)).

Computer bus and networks may provide logical and physical connections by conveying data and instruction signals. Connections inside computer may be referred to as "bus" connections, and connections between computers may be referred to as "inter-computer network." Optionally, a network may include gateways, which may be devices (computers) that specialize in data transmission and protocol conversion and allow users working in one network to access another network.

Networking environments (also referred to as a network) are common in offices, enterprise-wide computer networks, intranets and the Internet (i.e. world wide web). A network can be a wired or wireless. Exemplary network implementations include a local area network (LAN), a wide area network (WAN), a public switched telephone network (PSTN), an Integrated Services Network (ISDN), an infra-red (IR) link, a radio link, like Universal Mobile Tele-communications System (UMTS), Global System for Mobile Communication (GSM), Code Division Multiple Access (CDMA), and a satellite link. Exemplary transmission protocols and data formats include transmission control protocol/internet protocol (TCP/IP), hyper text transfer protocol (HTTP), secure HTTP, wireless application protocol, unique resource locator (URL), unique resource identifier (URI), hyper text markup language (HTML), extensible markup language (XML), extensible hyper text markup language (XHTML), and wireless application markup language (WML), etc.

Interfaces for linking together the data processing units of a data processing system may be, for example, a serial port interface, a parallel port interface, a universal serial bus (USB) interface, an internal modem, or an external modem.

Consistent with an embodiment of the invention, computer program products may be provided that include a plurality of instructions for causing a processor of a computer system to execute methods consistent with the present invention. Computer program products may define the operation of computer and its interaction in inter-computer network. For example, computer program products may be available as source code in any programming language and as object code (binary code) in a compiled form. Computer program products may be used in connection with support modules, such as compilers, interpreters, and operating systems. The computer program products may be stored in memory, such as a data carrier or a computer-readable medium.

For the communication of a computer program product and a computer, a data carrier may be conveniently inserted into input device. The data carrier may be implemented as any computer readable medium. A carrier may be an article of manufacture including a computer readable medium having readable program code embodied therein for executing a method. Furthermore, program signals may embody a computer program and be transmitted via inter-computer network to a data processor.

Figure 1:
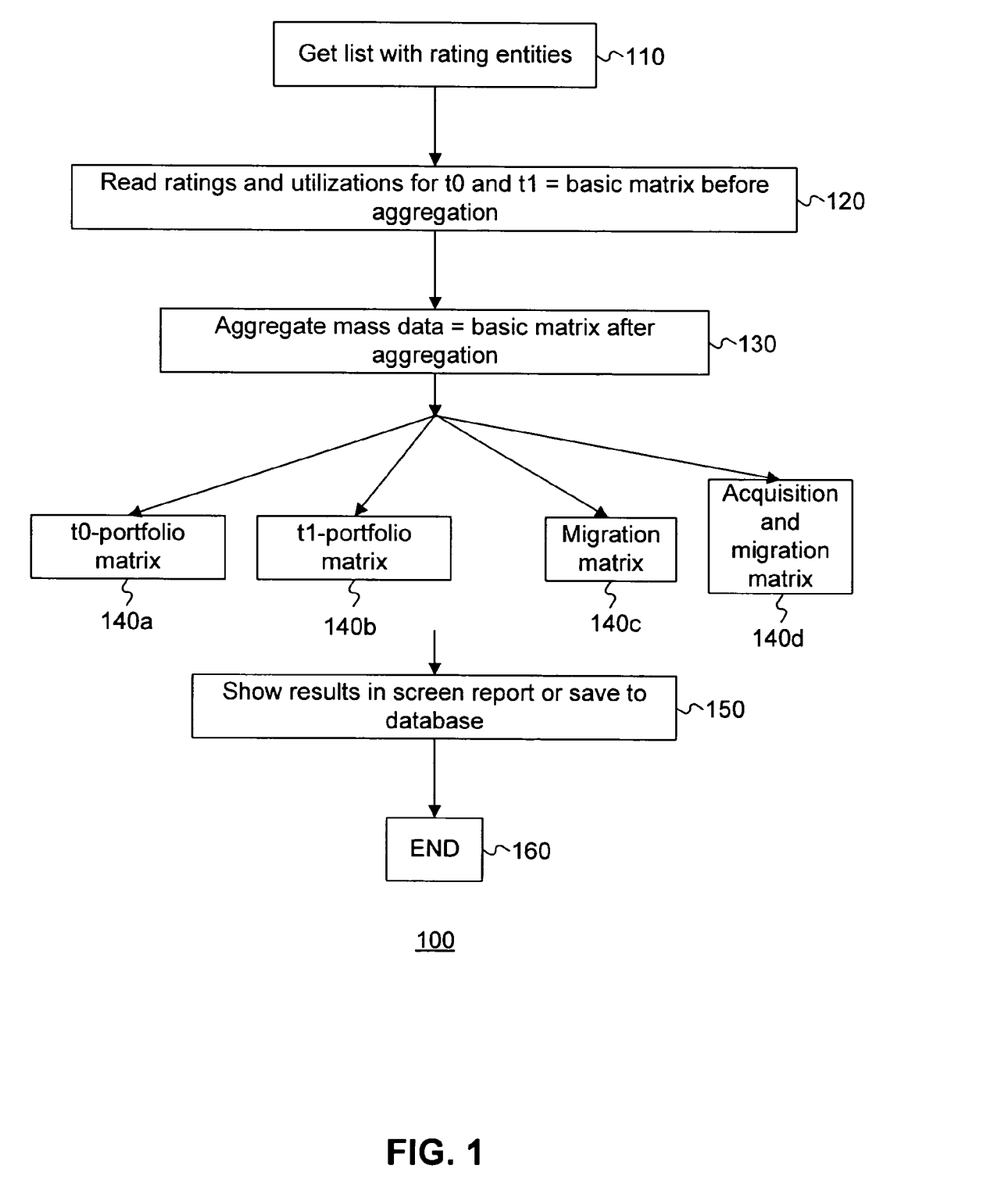
FIG. 1 illustrates a flowchart of an exemplary method for calculating matrices, consistent with an embodiment of the invention.

FIG. 1 illustrates a flowchart 100 of an exemplary method for calculating specified matrices associated with, for example, financial institutions and/or financial affairs in banking practice.

At step 110, a list with the rated entities may be provided. According to that list, at step 120, ratings and utilizations for T0 and T1 may be read from a historical database. A base matrix before aggregation may be created at step 120 by reading the mass data as a selection according to the rating entities.

At step 130, the mass data may be aggregated to create a base matrix after aggregation. The aggregated base matrix may be used to calculate different result matrices (140a-d). Exemplified result matrices may be T0-portfolio matrix (140*a*), T1-portfolio matrix (140*b*), a migration matrix (140*c*), and a combined matrix such as an acquisition and migration data (acquisition and migration matrix 140*d*).

In more detail, mass data may be used which may be stored in a historical database including, for example, a database with hundreds or millions of records. The mass data ("input data") may include a plurality of M data records, wherein M represents a large amount of data records to be selected and aggregated that can not be handled in the main memory of a data processor. Mass data ("input data") may include packetized blocks of data provided by different databases of different accessible data sources, and including sets of rows and sets of columns. Each row may correspond to a record, and the columns may include fields of predetermined granularity characteristics and fields of predetermined key figures. The generic aggregation of characteristics and key figures may reduce the mass data according to a given customized granularity. Due to the plurality of M data records, the mass data may be customized as packages including $M_p < M$ data records.

Computer-implemented methods consistent with the invention may begin with a selection of mass data ("input data"), including the plurality of M data records, to aggregate. The mass data may be provided by different accessible primary databases of different accessible data sources. After selecting mass data due to selection criteria, the selected blocks of packetized mass data may be assigned among each other, and the result of each assignment may be stored to a global database.

Customization of the selected mass data may be required for defining granularity characteristics and aggregation operations to be carried out by a processor in a data processing system for computing fields of key figures. The granularity characteristics and predetermined key figures may include, for example, data regarding the financial sector, such as rating methods, rating classes, rating class dates, identifiers for inflows and outflows, utilization (e.g. drawing of a loan (monetary amount)), utilization dates, and a segment identifier.

If necessary, the selected mass data may be prepared as data packages according to a customer-defined package size including $M_p < M$ data records in a pre-processing step before reading the mass data.

The packaged data may be enriched in parallel pre-processing with data from an accessible single secondary database or from accessible secondary databases. The results of enrichment may be saved to local databases of the respective data processors where the data may be processed.

The selected data records may be stored in a database (base matrix before aggregation) or may be directly aggregated into a base matrix after aggregation. The selection and/or aggregation can be performed as jobs. A job or a plurality of jobs can be processed in a parallel processing mode, thus improving the computing power and run time performance of software either using a single data processor or a network of data processors. Depending on the capacity utilization of a data processing system, the processing of an aggregation algorithm can optionally run in a linear processing mode to sequentially aggregate and merge packages within a job.

An aggregated base matrix may be obtained from the selection and aggregation processes (FIG. 1, step 130). The base matrix after aggregation may be stored in a database. The base matrix after aggregation may contain all the data necessary to calculate migration matrices for a credit risk analysis and reporting according to, for example, the Basel II Capital Accord.

The base matrix after aggregation may contain significantly less data than the originally used mass data. In one embodiment consistent with the invention, the base matrix after aggregation may contain at most a few thousand data entries depending on the predetermined granularity characteristics, such as the rating method used. For example, the base matrix after aggregation may include 1000 or fewer records, 500 or fewer records, etc. The base matrix after aggregation may include 100 or fewer columns, 20 or fewer columns, etc., wherein the columns include fields of predetermined granularity characteristics and fields of predetermined key figures.

Storing the aggregated base matrix permits an examination of the evaluations over a long time, without having to store many different matrices. Time and use of computer power for recalculation based on a historical database can also be avoided. Furthermore, different aggregated base matrices for all the needs of a financial institution can be calculated and provided to the different users of the financial institution. The different aggregated base matrices may have varying granularity characteristics and/or varying customer-defined key figures, such as a segment identifier, a rating method, a business partner identifier, a rating given by the rating method, a rating date, an identifier for inflows, an identifier for outflows, an utilization (e.g. drawing of a credit loan), and a currency of the utilization.

Consequently, different users of a financial institute do not require access to a historical database. Therefore, the administration of the system, the data integrity, and the performance of the system can be improved with low system requirements.

The obtained base matrix after aggregation may be processed into the specified matrices (140*a-d*). Because of the low amount of data, the processing of the base matrix after aggregation may be performed in the main memory of a computer. A specified matrix may be a matrix that may be customized by the users and/or prescribed by other institutions or requirements, such as Basel II. The specified matrices may also be referred to as result matrices and may include, for example, portfolio matrices at specified times, migration matrices, acquisition matrices, matrices concerning inflows and outflows, matrices concerning changes of volume and/or combinations of two or more of these matrices, such as an acquisition and migration matrix. Specified result matrices may also be calculated in batch modes (background processing), and the results may be stored to a database. The results can be stored in a database or alternatively displayed in a screen reporting (step 150).

The data of the aggregated base matrix and/or the result matrices may also be enriched in a post-processing step with data from an accessible secondary database or from accessible secondary databases. The results of the enrichment may be stored in a database.

Figure 2:
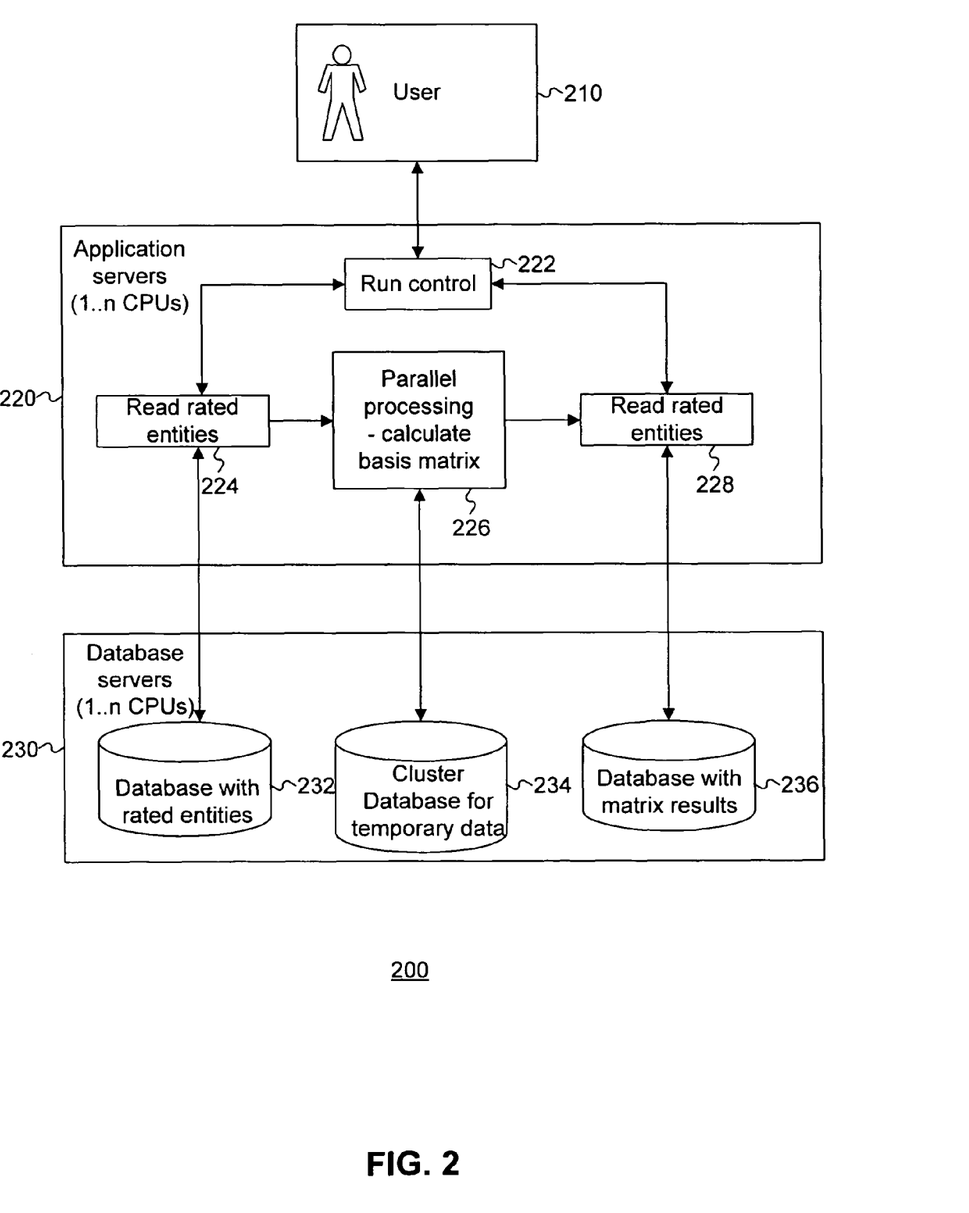
FIG. 2 illustrates a block diagram of an exemplary system, consistent with an embodiment of the invention.

FIG. 2 illustrates at a block diagram of an exemplary system 200, consistent with an embodiment of the invention. System 200 may include a user 210, one or more application servers 220, and one or more database servers 230. Mass data may be stored in a database with rated entities 232. Application server 220 may read the rated entities 224 and process the rated entities to calculate the base matrix, as illustrated at 226. The base matrix may be stored in a database for temporary data 234. The base matrix may be read into the main memory to calculate the result matrices. The results can be stored in an additional database 236. The methods performed by application server 220 may be scheduled and executed by run control 222.

Exemplary embodiments of the present invention will now be explained in more detail with a working example.

In a first step, all information of the period to be analyzed may be brought together. A bank may have business partner ratings modules of its own, or may obtain external ratings. These ratings may be stored in a database for time series of the bank analyzer component called historical database. The time series can be assumed to contain mass data (millions of business partner ratings).

The database may have the following fields:
SID: Segment Identifier (e.g., 01=Automotive);
RM: Rating method (e.g., INTERNAL=in-house rating model of the bank);
BUPA: Business partner identifier;
RAT: Rating given by the rating method;
RDAT: Rating date (date with the meaning "rating is valid from . . . ")
IO: Identifier for inflows and outflows (e.g. 1=inflow, 2=outflow);
UTIL: Utilization (e.g. drawing of a credit loan); and
CURR: Currency of the utilization.

Table 1 illustrates some exemplary entities of a historical database. Some or all of the business partners may be rated with all rating methods. Furthermore, the business partners may obtain more than one rating a year. Therefore, the present working example is very simple. The granularity level of Table 1 includes the fields SID, RM, BUPA and RDAT.

TABLE 1

| Segment ID SID | Rating Method RM | Business Partner BUPA | Rating Valid From RDAT | Rating RAT | Inflow/ Outflow IO | Utilization UTIL | Currency CURR |
| --- | --- | --- | --- | --- | --- | --- | --- |
| 1 | INTERNAL | BUPA_01 | 21.04.1999 | A |  | 100.000,00 | USD |
| 1 | INTERNAL | BUPA_01 | 26.04.2000 | A |  | 80.000,00 | USD |
| 1 | INTERNAL | BUPA_02 | 14.05.1999 | B |  | 100.000,00 | USD |
| 1 | INTERNAL | BUPA_02 | 12.08.2000 | C |  | 50.000,00 | USD |
| 1 | INTERNAL | BUPA_03 | 01.08.1999 | A |  | 50.000,00 | USD |
| 1 | INTERNAL | BUPA_03 | 01.08.2000 | B | 2 | 50.000,00 | USD |
| 1 | INTERNAL | BUPA_04 | 14.02.1999 | C |  | 200.000,00 | USD |
| 1 | INTERNAL | BUPA_04 | 18.09.2000 | C |  | 150.000,00 | USD |
| 1 | INTERNAL | BUPA_05 | 19.01.2000 | D | 1 | 100.000,00 | USD |
| 1 | INTERNAL | BUPA_06 | 04.11.1999 | B |  | 150.000,00 | USD |
| 1 | INTERNAL | BUPA_06 | 23.05.2000 | A |  | 200.000,00 | USD |
| 1 | INTERNAL | BUPA_07 | 25.09.1999 | B |  | 50.000,00 | USD |
| 1 | INTERNAL | BUPA_07 | 23.12.2000 | B |  | 30.000,00 | USD |

The first step of the calculation may be to read the database with the time series of ratings (FIG. 1, step 110). In one embodiment consistent with the invention, only the granularity fields SID (Segment Identifier), RM (Rating method), and BUPA (business partner identifier) may be retrieved. As a result of reading the database, table 2 may be obtained.

TABLE 2

| Segment ID SID | Rating Method RM | Business Partner BUPA |
| --- | --- | --- |
| 1 | INTERNAL | BUPA_01 |
| 1 | INTERNAL | BUPA_02 |
| 1 | INTERNAL | BUPA_03 |
| 1 | INTERNAL | BUPA_04 |
| 1 | INTERNAL | BUPA_05 |
| 1 | INTERNAL | BUPA_06 |
| 1 | INTERNAL | BUPA_07 |

At step 120 (FIG. 1), the time series with rating data may be transformed into a new list where rating at t0 and rating at t1 may be given in one row of the table to obtain a base matrix before aggregation. The transformation may be done by, for example, the following operations:

RT0: a rating of the time series (formerly field RAT) which was most recently assigned before t0 may be copied to the field RT0;

RT 1: a rating of the time series (formerly field RAT) which was most recently assigned before t1 may be copied to the field RT1;

UT0: a utilization of the time series (formerly field UTIL) which was previously assigned to the rating which is now in field RT0;

UT1: a utilization of the time series (formerly field UTIL) which was previously assigned to the rating which is now in field RT1;

FX: the utilizations may be converted to the evaluation currency with the evaluation times t0 and t1 (different market data and interest rates); differences in the utilizations of t0 and t1 that may be caused by foreign exchange may be stored in the new field FX; and CURR: evaluation currency.

In one embodiment consistent with the invention, step 120 may be performed by the software using efficient parallel processing algorithms.

The results of step 120 may be a matrix, such as the matrix illustrated in Table 3 below. The granularity level of Table 3 may include the fields SID, RM, and BUPA. In this example, all values for FX may be 0 because the initial currency and the evaluation currency are identical.

TABLE 3

| SID | RM | BUPA | RT0 | RT1 | UT0 | UT1 | FX | CURR | IO |
|---|---|---|---|---|---|---|---|---|---|
| 1 | INTERNAL | BUPA_01 | A | A | 100.000,00 | 80.000,00 | 0 | USD | |
| 1 | INTERNAL | BUPA_02 | B | C | 100.000,00 | 50.000,00 | 0 | USD | |
| 1 | INTERNAL | BUPA_03 | A | | 50.000,00 | | 0 | USD | 2 |
| 1 | INTERNAL | BUPA_04 | C | C | 200.000,00 | 150.000,00 | 0 | USD | |
| 1 | INTERNAL | BUPA_05 | | D | | 100.000,00 | 0 | USD | 1 |
| 1 | INTERNAL | BUPA_06 | B | A | 150.000,00 | 200.000,00 | 0 | USD | |
| 1 | INTERNAL | BUPA_07 | B | B | 50.000,00 | 30.000,00 | 0 | USD | |

The matrix obtained in step 120 may be aggregated to a basic matrix after aggregation (FIG. 1, step 130). While the matrices previously used in step 110 and step 120 (such as "time series with rating data" and "basic matrix before aggregation") may be used only once in the process, the "basic matrix after aggregation" may be the starting point for several additional matrices and may be re-used several times.

To aggregate the base matrix of step 120, the business partners (belonging to the same SID and RM) having the same ratings RT0 and RT1 may be counted, and the fields UT0 and UT1 may be summed for the business partners having the same ratings RT0 and RT1.

The present working example is very simple. Therefore, the resulting Table 4 (illustrated below) is very similar to Table 3. However, if more business partners are used that have the same rating combinations, a significant data reduction may be achieved. There may be thousands of rating combinations with RT0=B and RT1=B, although these thousands of data may be reduced to one record as illustrated in Table 4. To include the numbers of the business partners being aggregated, a new field CNT may be created including the number of ratings for the given granularity. The granularity level of Table 4 includes the fields SID, RM, RT0, RT1, and IO.

data"=>"basic matrix before aggregation"=>"basic matrix after aggregation" may be performed using efficient parallel processing algorithms.

To calculate result matrices (FIG. 1, 140*a-d*), the "basic matrix after aggregation" may be re-used repeatedly.

T0-portfolio matrix 140*a* may require key information, such as the structure of the portfolio at the beginning of the period. The structure may be defined by rating categories. The key measure may be the "key date utilization" (e.g., a monetary amount of loans UT0 and UT1).

The portfolio matrix may be calculated by summing the fields UT0, UT1, CNT, and FX for the different ratings at T0 (RT0). In one embodiment consistent with the invention, a filter (RT0="not empty") may be applied. The base matrix after aggregation obtained in step 130 (Table 4) may thus be modified to create Table 5, as illustrated below. The granularity level of Table 5 may include the fields SID, RM, and RT0. Granularities RT1 and IO may be eliminated.

TABLE 4

| SID | RM | RT0 | RT1 | IO | CNT | UT0 | UT1 | FX | CURR |
|---|---|---|---|---|---|---|---|---|---|
| 1 | INTERNAL | A | A | | 1 | 100.000,00 | 80.000,00 | 0 | USD |
| 1 | INTERNAL | B | A | | 1 | 150.000,00 | 200.000,00 | 0 | USD |
| 1 | INTERNAL | B | B | | 1 | 50.000,00 | 30.000,00 | 0 | USD |
| 1 | INTERNAL | B | C | | 1 | 100.000,00 | 50.000,00 | 0 | USD |
| 1 | INTERNAL | C | C | | 1 | 200.000,00 | 150.000,00 | 0 | USD |
| 1 | INTERNAL | | D | 1 | 1 | | 100.000,00 | 0 | USD |
| 1 | INTERNAL | A | | 2 | 1 | 50.000,00 | | 0 | USD |

TABLE 5

| SID | RM | DESCRIPTION | RT0 | RT1 | CNT | UT0 | UT1 | FX | CURR |
|---|---|---|---|---|---|---|---|---|---|
| 1 | INTERNAL | 01 Portfolio zu t0 | A | | 2 | 80.000,00 | 150.000,00 | 0 | USD |
| 1 | INTERNAL | 01 Portfolio zu t0 | B | | 3 | 280.000,00 | 300.000,00 | 0 | USD |
| 1 | INTERNAL | 01 Portfolio zu t0 | C | | 1 | 150.000,00 | 200.000,00 | 0 | USD |

In this example, the number of ratings is 1 for each granularity, that is, for each combination of the values SID, RM, RT0, RT1, and IO. The values in the columns CNT, UT0, and UT1 may be sums. The sequence "time series with rating T1-portfolio matrix 140*b* may require transparent information on the portfolio structure at the end of the period under consideration based on consistent dimensions and measures. The portfolio matrix 140*b* may be calculated by, for example, summing the fields UT0, UT1, CNT, and FX for the different ratings at T1 (RT1). In one embodiment consistent with the invention, a filter (RT1="not empty") may be applied. Based on Table 4 as mentioned above (base matrix after aggregation, FIG. 1, step 130), Table 6 may be created, which may represent T1-portfolio matrix 140b. The granularity level of Table 6 may include the fields SID, RM, and RT1. Granularities RT0 and IO may be eliminated.

TABLE 6

| SID | RM | DESCRIPTION | RT0 | RT1 | CNT | UT0 | UT1 | FX | CURR |
|---|---|---|---|---|---|---|---|---|---|
| 1 | INTERNAL | 01 Portfolio zu t0 | | A | 2 | 250.000,00 | 280.000,00 | 0 | USD |
| 1 | INTERNAL | 01 Portfolio zu t0 | | B | 1 | 50.000,00 | 30.000,00 | 0 | USD |
| 1 | INTERNAL | 01 Portfolio zu t0 | | C | 2 | 300.000,00 | 200.000,00 | 0 | USD |
| 1 | INTERNAL | 01 Portfolio zu t0 | | D | 1 | 0 | 100.000,00 | 0 | USD |

Migration matrix 140c (FIG. 1) may include information about a change of ratings. Migration matrix 140c may determine in which rating categories the customers show up at the end of a period given a specific rating at the beginning of the period. The key figures CNT and UT0 (UT1) may be used to calculate rating transitions (e.g., weighted or unweighted frequencies or probabilities).

The migration matrix may be calculated by summing up the fields UT0, UT1, CNT, and FX for the different rating transitions RT0→RT1 on the specified granularity. In one embodiment consistent with the invention, a filter (RT0="not empty" and RT1="not empty") may be applied. Based on Table 4 (base matrix after aggregation, FIG. 1, step 130), Table 7 may be created. The granularity level of Table 7 may include the fields SID, RM, RT0, and RT1.

TABLE 7

| SID | RM | DESCRIPTION | RT0 | RT1 | CNT | UT0 | UT1 | FX | CURR |
|---|---|---|---|---|---|---|---|---|---|
| 1 | INTERNAL | 11 Migrationsmatrix | A | A | 1 | 100.000,00 | 80.000,00 | 0 | USD |
| 1 | INTERNAL | 11 Migrationsmatrix | B | A | 1 | 150.000,00 | 200.000,00 | 0 | USD |
| 1 | INTERNAL | 11 Migrationsmatrix | B | B | 1 | 50.000,00 | 30.000,00 | 0 | USD |
| 1 | INTERNAL | 11 Migrationsmatrix | B | C | 1 | 100.000,00 | 50.000,00 | 0 | USD |
| 1 | INTERNAL | 11 Migrationsmatrix | C | C | 1 | 200.000,00 | 150.000,00 | 0 | USD |

The acquisition and migration matrix 140b may be assembled by the single matrices described before. Furthermore, the acquisition and migration matrix 140b can contain additional data based on the base matrix as mentioned above, for example, data of inflows and outflows of customers, customer acquisitions, changes in volume, acquisition performance, and the portfolio after migrations.

The data of inflows and outflows of customers may be calculated by applying an appropriate filter based on the base matrix. The customer acquisition may arise from the total of customer wins and customer losses. The calculation of the portfolio after migration to t1 may also be based on the already determined data, the portfolio at t0, as well as the migration matrix. An exemplary calculation step is:

volume of the portfolio after migration to $t1$=portfolio at $t0$+inflows and outflows for each rating class with volumes of $t1$+outflows for each rating class with volumes of $t1$.

The changed volume may be calculated as volume of the portfolio at t1 minus volume of the portfolio after migration to t1 minus customer acquisition. The acquisition performance may be calculated as the total of customer acquisition and changed volume.

In the present working example, Table 8 may be achieved for the acquisition and migration matrix 140d.

TABLE 8

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 1 | 01 portfolio at t0 | | | A | 2 | | 150000 | 80000 | 0 | USD |
| 1 | INTERNAL | 1 | 01 portfolio at t0 | | | B | 3 | | 300000 | 280000 | 0 | USD |
| 1 | INTERNAL | 1 | 01 portfolio at t0 | | | C | 1 | | 200000 | 150000 | 0 | USD |
| 1 | INTERNAL | 2 | 02 portfolio at t1 | | A | | 2 | | 250000 | 280000 | 0 | USD |
| 1 | INTERNAL | 2 | 02 portfolio at t1 | | B | | 1 | | 50000 | 30000 | 0 | USD |
| 1 | INTERNAL | 2 | 02 portfolio at t1 | | C | | 2 | | 300000 | 200000 | 0 | USD |
| 1 | INTERNAL | 2 | 02 portfolio at t1 | | D | | 1 | | 0 | 100000 | 0 | USD |
| 1 | INTERNAL | 3 | 03 in-migrations from . . . to . . . | | B | A | 1 | | 150000 | 200000 | 0 | USD |
| 1 | INTERNAL | 3 | 03 in-migrations from . . . to . . . | | B | C | 1 | | 100000 | 50000 | 0 | USD |
| 1 | INTERNAL | 4 | 04 out-migrations to . . . from . . . | | A | B | 1 | | 150.000− | 200.000− | 0 | USD |
| 1 | INTERNAL | 4 | 04 out-migrations to . . . from . . . | | C | B | 1 | | 100.000− | 50.000− | 0 | USD |
| 1 | INTERNAL | 5 | 05 customers lost (after t0) | | A | | 1 | | 50.000− | | 0 | USD |

TABLE 8-continued

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 6 | 06 customers won (at t1) | | | D | 1 | | | 100000 | 0 | USD |
| 1 | INTERNAL | 7 | 07 customer acquisitions | A | | | 1 | 50.000– | | | 0 | USD |
| 1 | INTERNAL | 7 | 07 customer acquisitions | D | | | 1 | 100000 | | | 0 | USD |
| 1 | INTERNAL | 8 | 08 changed volume | A | | | | 20.000– | | | 0 | USD |
| 1 | INTERNAL | 8 | 08 changed volume | B | | | | 20.000– | | | 0 | USD |
| 1 | INTERNAL | 8 | 08 changed volume | C | | | | 50.000– | | | 0 | USD |
| 1 | INTERNAL | 8 | 08 changed volume | D | | | | 100.000– | | | 0 | USD |
| 1 | INTERNAL | 9 | 09 acquisition performance | A | | | | 70.000– | | | 0 | USD |
| 1 | INTERNAL | 9 | 09 acquisition performance | B | | | | 20.000– | | | 0 | USD |
| 1 | INTERNAL | 9 | 09 acquisition performance | C | | | | 50.000– | | | 0 | USD |
| 1 | INTERNAL | 9 | 09 acquisition performance | D | | | | 100000 | | | 0 | USD |
| 1 | INTERNAL | 10 | 10 portfolio after migrations at t1 | A | | | 3 | 350000 | | | 0 | USD |
| 1 | INTERNAL | 10 | 10 portfolio after migrations at t1 | B | | | 1 | 50000 | | | 0 | USD |
| 1 | INTERNAL | 10 | 10 portfolio after migrations at t1 | C | | | 2 | 250000 | | | 0 | USD |

Bringing all the different aspects together, the actions and events which lead to the changed risk profile within the period under consideration has been described. Based on this information, risk management may be provided with better information to adequately adjust the customer acquisition strategy, focus on customer retention, and react on unfavorable rating migration effects.

As all these actions may be taken by different parties within the financial institutions, the consistent information basis provided above may ensure that consistent actions can be initiated.

Other embodiments of the invention will be apparent to those skilled in the art from consideration of the specification and practice of embodiments and features of the invention disclosed herein. It is intended, therefore, that the specification and embodiments be considered as exemplary only, with a true scope and spirit of the invention being indicated by the following claims.

What is claimed is:

1. A computer-implemented method for determining specified matrices, comprising:
    receiving mass data from one or more databases of one or more different data sources associated with banking practice, the mass data including data packages organized as sets of rows and sets of columns, each row corresponding to a record, and the columns including fields of predetermined granularity characteristics and fields of predetermined key figures;
    selecting at least one of the predetermined granularity characteristics and at least one of the predetermined key figures;
    selecting, from a plurality of stored aggregation operations, at least one predetermined aggregation operation to be performed;
    reading the data packages from the one or more databases;
    processing, by a computer, the data packages by:
        identifying the selected at least one of the predetermined granularity characteristics;
        identifying the selected at least one of the predetermined key figures; and
        aggregating the records in the data packages based on the selected at least one of the predetermined granularity characteristics and the selected at least one of the predetermined key figures by using the selected predetermined aggregation operation;
    forming, by the computer, a base matrix comprising the aggregated records; and
    calculating, by the computer, specified matrices using the base matrix.

2. The method of claim 1, wherein the selected at least one predetermined aggregation operation is selected from at least one of a function pool or customer-defined aggregation operations.

3. The method of claim 1, wherein the aggregation is processed for at least one of customer-defined granularity characteristics and customer-defined key figures that are to be defined using the predetermined aggregation operations selected from a function pool and using at least one of the at least one predetermined aggregation operation and the customer-defined aggregation operations.

4. The method of claim 1, wherein at least one of the predetermined key figures and the predetermined granularity characteristics includes rating methods, rating classes, and rating class dates.

5. The method of claim 1, wherein the predetermined granularity characteristics include an identifier for inflows and outflows.

6. The method of claim 1, wherein at least one of the key figures and the granularity characteristics include utilization and utilization dates.

7. The method of claim 6, wherein the utilization comprises the monetary amount of a loan.

8. The method of claim 6, wherein the aggregation of the utilization is performed by summarization.

9. The method of claim 1, wherein the granularity characteristics includes segment identifiers.

10. The method of claim 1,
    wherein the specified matrices include at least one of portfolio matrices at specified times, migration matrices, acquisition matrices, matrices concerning in and out flows, or matrices concerning changes of volume; or
    wherein the specified matrices include a combination of two or more of portfolio matrices at specified times, migration matrices, acquisition matrices, matrices concerning in and out flows, or matrices concerning changes of volume.

11. The method of claim 1, wherein the mass data are processed in a parallel processing mode using a single data processor.

12. The method of claim 1, wherein the mass data are processed in a parallel processing mode using a network of data processors.

13. The method of claim 12, wherein the network of data processors is at least one of a Local Area Network (LAN), a Wide Area Network (WAN), an intranet, or an Internet.

14. The method of claim 1, wherein the data packages are processed within jobs, and wherein the jobs are processed in a parallel processing mode using a single data processor, thereby aggregating and merging the data packages of a job sequentially.

15. The method of claim 1, wherein the data packages are processed within jobs, and wherein the jobs are processed in a parallel processing mode using a network of data processors, thereby aggregating and merging the data packages of a job sequentially.

16. The method of claim 1, further comprising an additional calculation step for enriching the aggregated or the source data packages.

17. A non-transitory computer-readable medium comprising program code instructions which, when executed in a processor, perform a method comprising the following steps:

receiving mass data from one or more databases of one or more different data sources associated with banking practice, the mass data including data packages organized as sets of rows and sets of columns, each row corresponding to a record, and the columns including fields of predetermined granularity characteristics and fields of predetermined key figures;

selecting at least one of the predetermined granularity characteristics and at least one of the predetermined key figures;

selecting, from a plurality of stored aggregation operations, at least one predetermined aggregation operation to be performed;

reading the data packages from the one or more databases;

processing the data packages by:
    identifying the selected at least one of the predetermined granularity characteristics;
    identifying the selected at least one of the predetermined key figures; and
    aggregating the records in the data packages based on the selected at least one of the predetermined granularity characteristics and the selected at least one of the predetermined key figures by using the selected predetermined aggregation operation;

forming a base matrix comprising the aggregated records; and calculating specified matrices using the base matrix.

* * * * *